United States Patent [19]

Deffner et al.

[11] Patent Number: 5,793,936

[45] Date of Patent: Aug. 11, 1998

[54] CENTER-LINE ANTI-ALIASING FOR DIGITAL PRINTING

[75] Inventors: Gerhard P. Deffner, Dallas; Vadlamannati Venkateswar, Plano, both of Tex.

[73] Assignee: Texas Instruments Incorporated, Dallas, Tex.

[21] Appl. No.: 720,365

[22] Filed: Sep. 27, 1996

[51] Int. Cl.⁶ ..................................................... G06T 5/00
[52] U.S. Cl. ...................... 395/109; 395/110; 382/269; 382/254; 358/447
[58] Field of Search ........................... 395/109, 102, 395/110; 382/266, 269, 270, 299; 358/447, 455, 462

[56] References Cited

U.S. PATENT DOCUMENTS

| | | | |
|---|---|---|---|
| 4,162,482 | 7/1979 | Su | 382/266 |
| 5,473,709 | 12/1995 | Aoki | 382/258 |
| 5,657,430 | 8/1997 | Smith et al. | 395/102 |

OTHER PUBLICATIONS

Foley, et al. *Computer Graphics, Principles & Practice*, Addison–Wesley Pub. Co. Inc., 2nd Ed. 1990, pp. 132–140.

*Primary Examiner*—Scott Rogers
*Attorney, Agent, or Firm*—Julie L. Reed; James C. Kesterson; Richard L. Donaldson

[57] ABSTRACT

A method of eliminating the effects of aliasing when printing objects having opposing edges. A center line between the opposing edges is identified. (FIG. 3). "Opposing pixels" on the edges are also identified and assigned offsetting grayscale values. (FIG. 4). This prevents the distances between the edges from appearing too narrow or too wide.

13 Claims, 3 Drawing Sheets

CENTER-LINE ANTI-ALIASING FOR DIGITAL PRINTING

TECHNICAL FIELD OF THE INVENTION

This invention relates generally to digital printing systems, and more particularly, to a method of reducing aliasing effects.

BACKGROUND OF THE INVENTION

Existing electrophotographic printer technologies make use of a photoconductive drum. Depending on the type of photoconductor used, the drum is either charged or discharged to attract toner, with the charging or discharging accomplished by reflecting light onto the drum. The drum then transfers the toner to the paper or other surface to be printed upon.

To expose the drum, a light modulator or other imaging device may be used. Typically, the imaging device has an array of pixels as wide as the printed image. These pixels are addressed with data, which indicates the exposure for each pixel. The drum rotates so that one line of the drum is exposed by a line of pixels during each line period.

To some extent, gray scaling can be done by varying the exposure at points on the drum to control the amount of toner on any point. One way to vary the exposure is to re-expose the same line of the drum by successive lines of pixels. As the drum rotates, overlapping exposures are accumulated on it. Each line is re-exposed for as many times as is desired for a given grayscale capability. This approach to providing grayscale is referred to as "multi-level" printing. Its main limitation is that it permits only a limited number of levels of gray.

The quality of text printed on electrophotographic printers is degraded by the fact that all that are not exactly vertical or horizontal will show deviations from their true shape. More specifically, these lines will appear as "stair stepped." This artifact is sometimes referred to as "aliasing." In fonts, the effect of aliasing is proportional to the amount of curvature in a font. Examples of fonts that are especially susceptible are serifs and italics.

For binary printers, where the pixels are either colored or not colored (without grayscale), the traditional solution to reduce aliasing is to increase the resolution, such as from 300 dpi (dots per inch) to 400 or 600 dpi. Problems with this approach are the need for more refined electrophotographic processes and high system overhead in terms of memory and bandwidth.

With printers that are capable of grayscale printing, aliasing can be reduced with techniques using grayscale. For example, pixels on edges of a black colored object can be colored gray so that the stair stepping is not as evident. For printing characters, their font bit-maps include outline pixels having grayscale levels that reduce aliasing. The selection of these grayscale levels is the result of ad hoc and experimental decision making on a character by character basis.

SUMMARY OF THE INVENTION

One aspect of the invention is a method of reducing aliasing on a digital printer capable of printing an image with grayscale values. The method is designed for printing objects that are represented by graphical description data that describes at least two opposing edges of the object, such as alphanumeric characters or graphics primitives. A "center line" between two opposing edges is calculated from the graphic description data. Pixels are assigned to any area entirely overlapped by the object or on opposing edges. A grayscale of maximum intensity is assigned to pixels entirely overlapped by the object. Grayscale values are assigned to pixels on the opposing edges by identifying pairs of "opposing pixels" with respect to the center line. For each pair of opposing pixels, a grayscale level is assigned to a first pixel so as to compensate for the grayscale level of the other pixel. In this manner, if two pixels are each on an opposing edge and are opposite from each other with respect to the center line, both will not be given the same grayscale, which can have the effect of thickening or thinning the distance between the edges. For example, instead of making both pixels of an opposing pair gray, one might be made black and the other white.

An advantage of the invention is that provides an alternative to increased resolution as a solution to aliasing. It reduces the effects of aliasing without causing lines to appear thicker or thinner than their "true" width.

Other anti-aliasing algorithms can be based on center line data, as well as on data representing the distance between opposing edges (line width). These algorithms provide a better alternative to anti-aliasing than the existing ad hoc "hinting" schemes widely used for fonts.

DETAILED DESCRIPTION OF THE INVENTION

The invention described herein is in terms of use with an electrophotographic printer, specifically, one in which a photoconductive drum is exposed by light from a spatial light modulator. The invention is also useful with electrophotographic printers with other exposure devices. Furthermore, the printer need not be electrophotographic, and can be any printer that provides grayscale images from digital data. In general, the invention is directed to a method of providing grayscale values to reduce the effect of aliasing when printing objects, such as alphanumeric characters, that have opposing edges.

Figure 1:
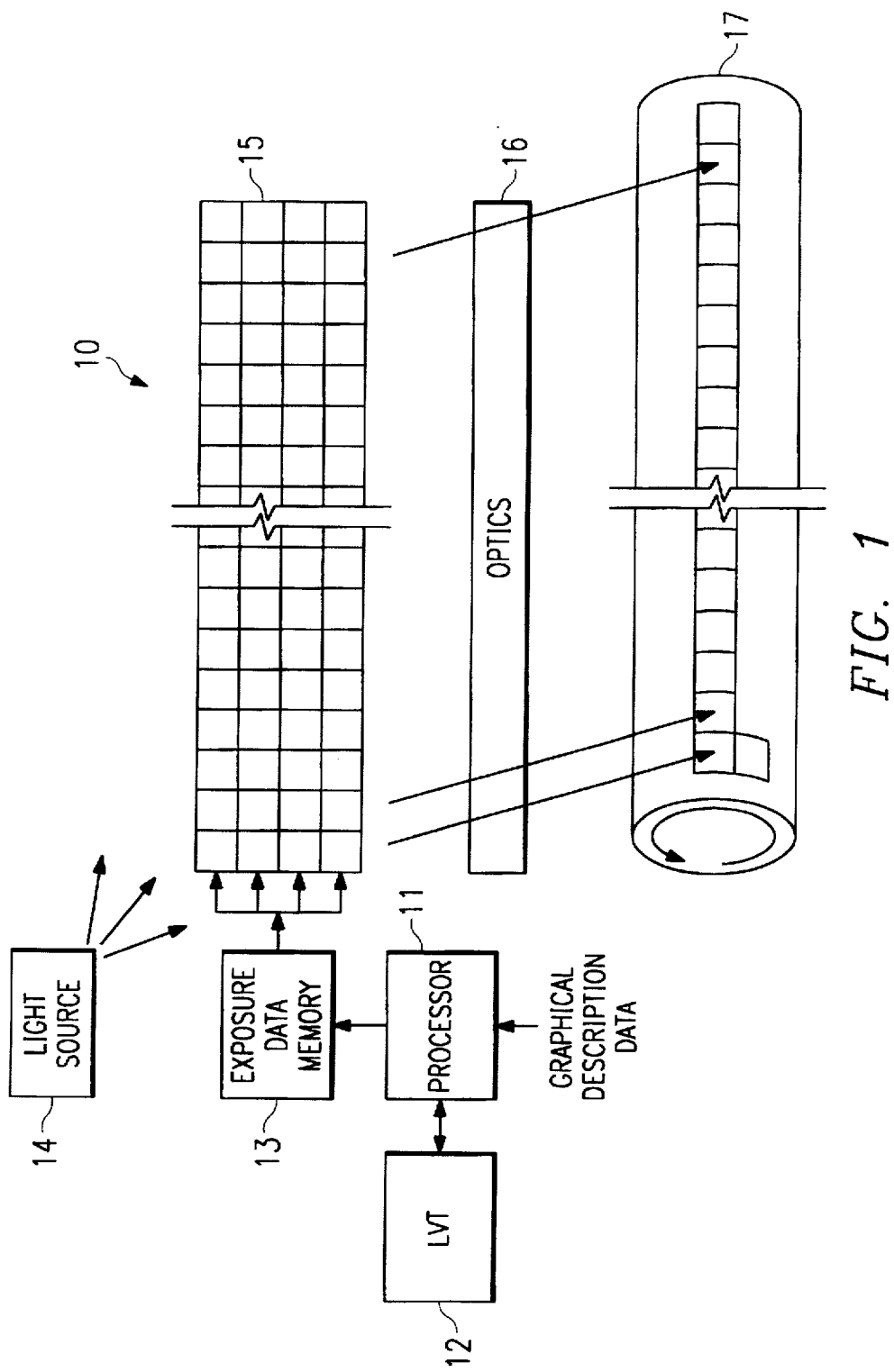
FIG. 1 illustrates a printer system having a processor programmed in accordance with the invention.

FIG. 1 illustrates a printing system 10 having a processor 10 programmed to implement the method of the invention. A drum 17 is exposed with a spatial light modulator (SLM) 15 having an array of pixels.

Processor 11 receives graphical description data for objects to be printed. As explained below, processor 11 uses this data to determine center lines for the objects. It may also use the graphical description data to determine line width. In either case, center line data and line width data is used algorithmically to determine grayscale levels for pixels on edges (for controlling line width) or on the center line (for simulating embossed print). Processor 11 accesses look-up tables 12 to convert the grayscale values to exposure values. These values may directly represent exposure levels, or some other process may be used to obtain exposure levels.

U.S. patent Ser. No. 08/038,398, entitled "Grayscale Printing Using Spatial Light Modulators", assigned to Texas Instruments Incorporated and incorporated herein by reference, describes various methods for exposing a drum with a digital micro-mirror device, a type of spatial light modulator. The exposure values are stored in an exposure data memory 13 in a format appropriate for delivery to the SLM 15. The SLM 15 is illuminated by a light source 14, and appropriate optics 16 are used to transfer the SLM image to the drum 17.

Figure 2:
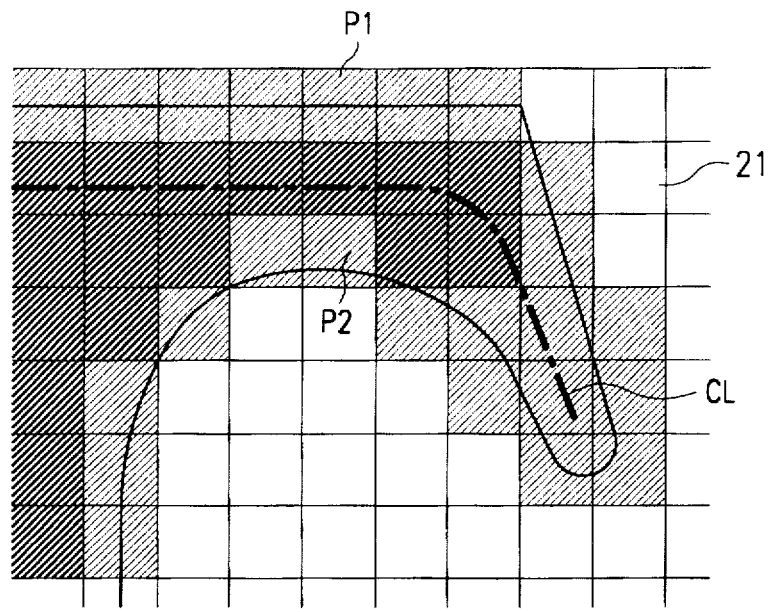
FIG. 2 illustrates a portion of a character printed in accordance with the invention.

FIG. 2 illustrates a portion of a character "T" printed in accordance with the invention. A grid of pixels 21 that will be printed (or not printed) to form the character are also shown. As indicated, each pixel 21 that is completely overlapped by character is solid black. However, each pixel 21 that falls on the edge of the character is some shade of gray. As explained below, in accordance with the invention, the level of grayscale for each pixel that falls on an edge is determined by calculating a center line, CL, within the character and by identifying "opposing pixels", such as P1 and P2, with respect to the center line.

Figure 3:
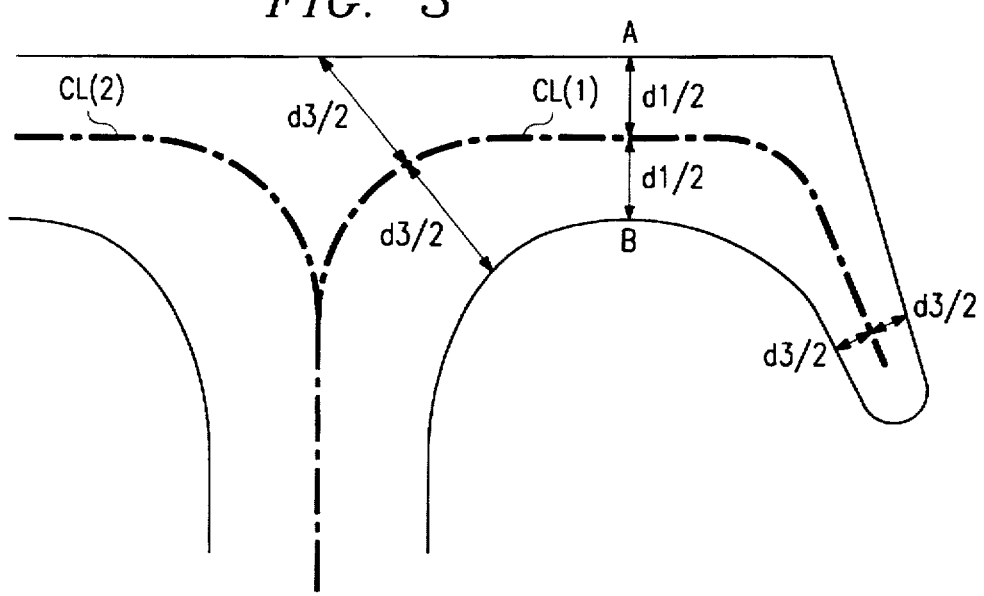
FIG. 3 illustrates the determination of the center line of the character of FIG. 3.

FIG. 3 illustrates the determination of the "center lines" of the character of FIG. 2. Alphanumeric characters, such as the T of FIG. 2 are "closed" in the sense that they are defined by a closed edge. These characters can be described mathematically, and this description can be used to mathematically obtain a center line for that character. For purposes of this description, the "center line" is a line or lines within a character that best describes the midpoint between the closer of two opposing edges at any given point. For example, d1 is the shortest distance between point A on an edge to another point on the opposing edge, point B. The midpoint of d1 is at d1/2, which is on the center line, CL(1). Likewise, d2/2 and d3/2 represent the distances between midpoints and other opposing pixels on the opposing edges. Another center line of the character "T" is the center line, CL(2), that extends across the other side of the top of the T.

Figure 4:
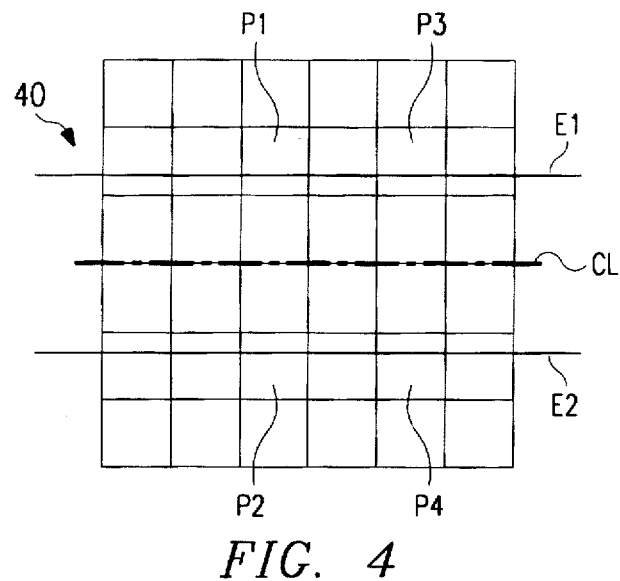
FIG. 4 illustrates an example of center-line anti-aliasing in accordance with the invention.

FIG. 4 illustrates a simple example of center-line based anti-aliasing in accordance with the invention. In FIG. 4, a line 40, which could be a portion of an alphanumeric character, has two opposing edges, E1 and E2. The center line, CL, between these edges is indicated as a dotted line.

Like the character of FIG. 2, line 40 is superimposed over a grid of pixels, which will be printed (or not printed) to form the image. The pixels used to print the image either entirely overlap object 40, in which case they will be printed black, or they partly overlap, in which case they will be printed some shade of gray.

A pair of "opposing" pixels is identified as P1 and P2. These pixels are "opposing" with respect to the center line 40 because they are both equidistant from the center line, CL.

Although both opposing pixels, P1 and P2, have about the same overlap with line 40, they are not assigned the same grayscale. More specifically, pixels P1 and P2 have less area covered by the line 40 that not covered. In a typical grayscale anti-aliasing method, these two pixels would each be assigned a grayscale value less than mid-range. However, assigning each pixel such a value would have the perceived effect of narrowing the distance between them. Then line 40 would be perceived as being thinner at that point than its true shape. Instead, one of the pixels is assigned a higher intensity than the other. For example, pixel P1 might be assigned a "black" intensity and pixel P2 a "white" intensity. Other "opposing" pixel-pairs, such as P3 and P4, would be identified and assigned values in a corresponding manner.

Thus, for this example, P3 would also be black and P4 white. This would have the effect of eliminating aliasing, while at the same time, maintaining the true width of the line. The net effect is that the line is shifted upward.

Although the above description is in terms of alphanumeric characters, the invention can be used with any object that is described graphical description data, from which a center line can be calculated. In general, for any line, whether curved or straight, a center line can be calculated or approximated. Moreover, the opposing edges can be asymmetrical, such as are the edges at the curved portion of the T of FIGS. 2 and 3.

Compensating opposing pixels, as described above, is only one example of adjusting the grayscale of two "opposing" pixels in accordance with the geometry of the object. Other adjustments could be made that would provide the optimum image quality in terms of both anti-aliasing and maintaining the true shape and position of the character.

Figure 5:
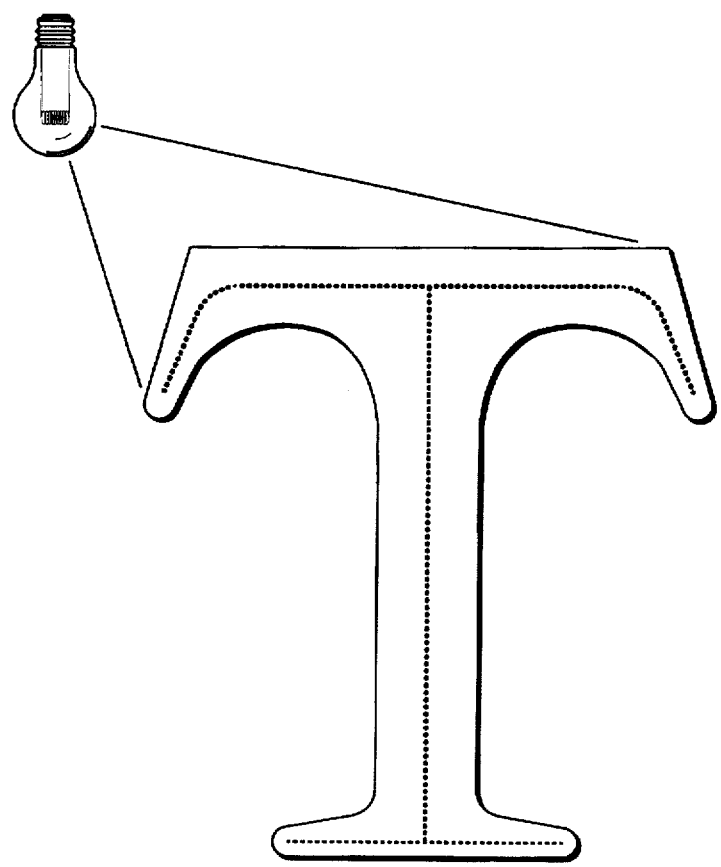
FIG. 5 illustrates an example of simulating embossed print using a center line.

FIG. 5 illustrates another use of center lines within a character, here a "T". Here, the center lines are used to simulate embossed print. This is done by simulating a light source. The center lines identify the "top" of the character, with respect to the light source. Areas at the top of the character are highlighted. The center lines also delineate the "distant" sides of the character from the "close" sides with respect to the imaginary light source. This permits the distant sides to be printed darker than the close sides, with the grayscale varying with the distance from the light.

The center line between two opposing edges can be used in other anti-aliasing algorithms. The direction of the center line could be monitored so that grayscale anti-aliasing is weighted in favor of diagonal lines rather than vertical or horizontal lines. In general, the worst case aliasing occurs with lines at a 45 degree angle and such lines might be treated differently than lines at other angles.

Grayscale anti-aliasing can also be used to smooth or accentuate changes in line width (the distance between two opposing edges). The relationship between the direction of change and the direction of the center line could be monitored, and only changes along the direction of the center line might warrant insertion of gray pixels on the side of the character. This would avoid anti-aliasing on straight vertical and horizontal lines.

Line-width can also be used independently of the center line, to improve anti-aliasing techniques. For example, anti-aliasing decisions could be based on the rate of change of line width. Gradual changes might call for more grayscale anti-aliasing that abrupt changes.

Regardless of the specific algorithm, the common feature of using center line and line width data, is that the data can be used to make anti-aliasing decisions algorithmically, rather than on an ad hoc, per object, basis.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of generating grayscale values for printing an object as an image comprised of pixels, where the object is represented by graphical description data that describes at least one pair of opposing edges of the object, comprising the steps of:

determining a center line between said opposing edges, using said graphic description data, said center line defined by midpoints between pairs of pixels on said opposing edges;

associating said pixels with any area entirely overlapped by said object or on said opposing edges; and assigning a grayscale level to any of said pixels that are entirely overlapped by said object and to each of said pairs of pixels on said opposing edges, with said grayscale level of one of said pixels of a pair being determined at least in part by the grayscale level of the other of said pixels of that pair.

2. The method of claim 1, wherein said step of assigning a grayscale level is accomplished by offsetting brightness of one said grayscale level by the other said grayscale level.

3. The method of claim 1, wherein said object has two or more pairs of opposing edges, and wherein said center line is between the closer of said opposing edges.

4. The method of claim 3, wherein said opposing edges form a closed outline of said object.

5. The method of claim 1, wherein said object is an alphanumeric character and wherein said graphical description data is font data.

6. The method of claim 1, wherein said object is a graphics primitive and wherein said graphical description data describes said primitive.

7. The method of claim 1, further comprising the step of determining the direction of said center line and wherein said assigning step is performed such that said pairs of pixels on opposing edges are assigned grayscale values depending on said direction.

8. The method of claim 1, further comprising the step of calculating changes in distance between said opposing edges and wherein said assigning step is based at least in part on said changes in distance.

9. A method of generating grayscale values for printing simulated embossed alphanumeric characters as images comprised of pixels, where each said character is represented by graphical description data that describes at least one pair of opposing edges of the character, comprising the steps of:

determining a center line between said opposing edges, using said graphic description data, said center line defined by midpoints between pairs of pixels on said opposing edges;

associating said pixels with any area entirely overlapped by said object or on said opposing edges; and assigning grayscale values to said pixels, such that pixels containing said center line have grayscale values of substantially greater magnitude than other of said pixels.

10. The method of claim 9, wherein said step of assigning grayscale values to said pixels is further accomplished such that pixels on one of said opposing edge have less intense grayscale levels than pixels on the other of said opposing edge.

11. The method of claim 9, wherein said character has two or more pairs of opposing edges, and wherein said center line is between the closer of said opposing edges.

12. The method of claim 11, wherein said opposing edges form a closed outline of said character.

13. The method of claim 9, wherein said graphical description data is font data.

* * * * *